W. H. HUTCHINSON.
EGG DETECTOR.
APPLICATION FILED FEB. 18, 1911.
1,005,220.
Patented Oct. 10, 1911.
2 SHEETS—SHEET 2.
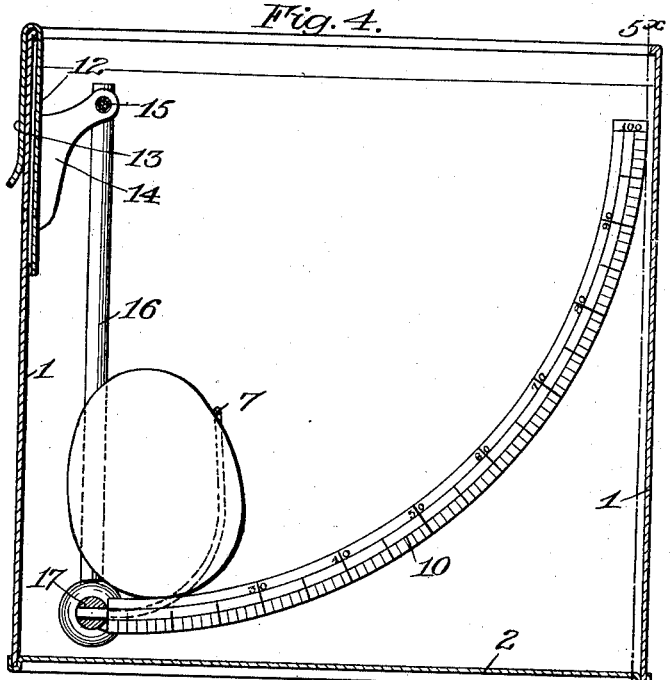
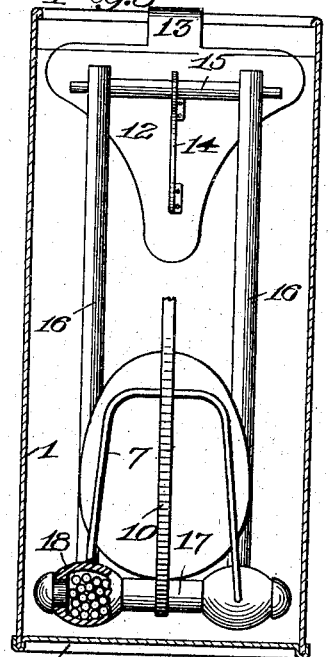
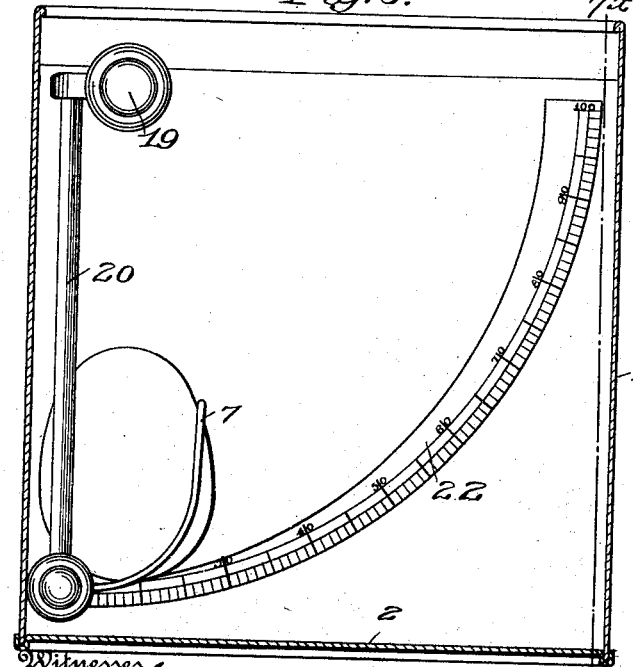
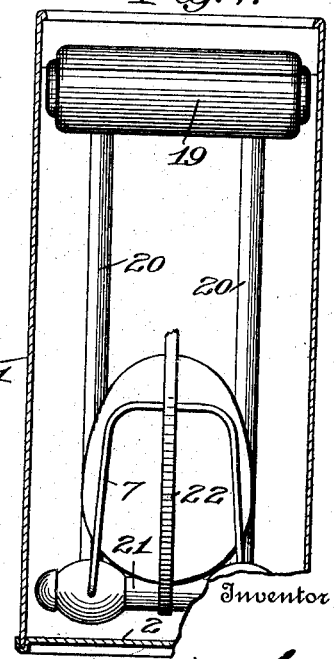

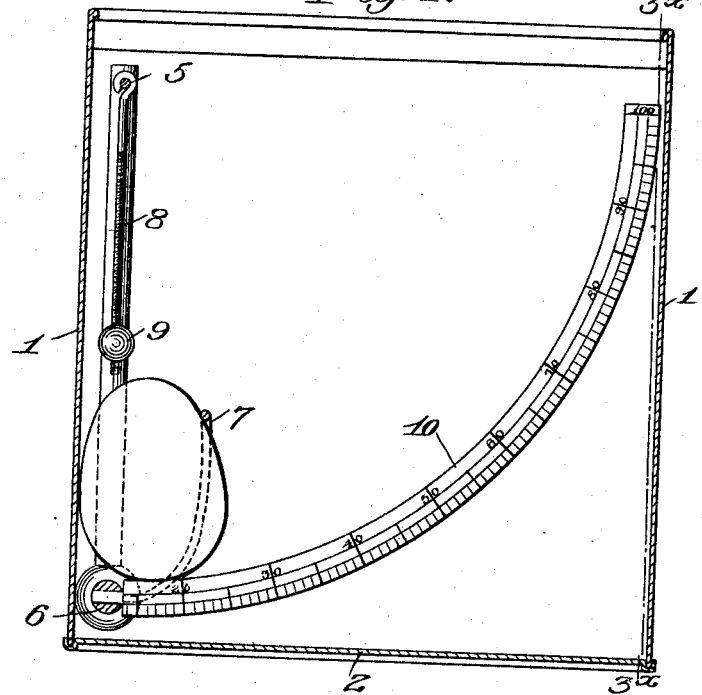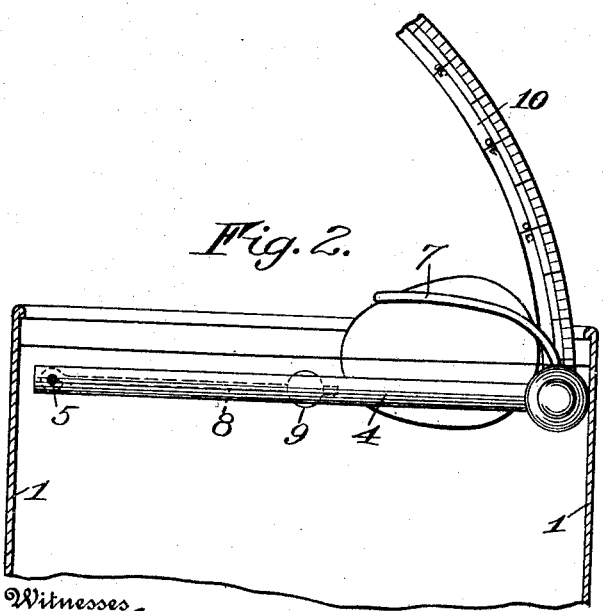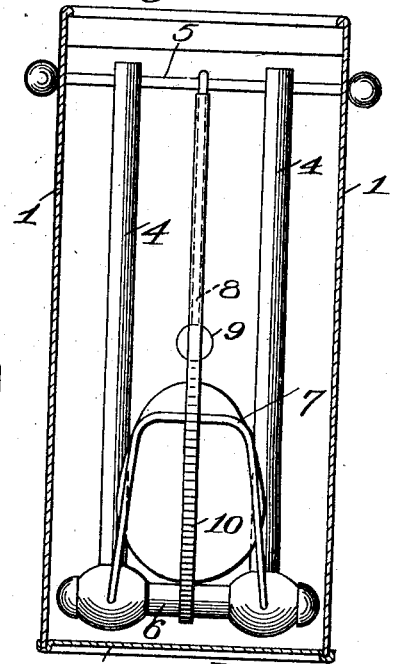

UNITED STATES PATENT OFFICE.

WILLIAM H. HUTCHINSON, OF ROCHESTER, NEW YORK.

EGG-DETECTOR.

1,005,220.     Specification of Letters Patent.     Patented Oct. 10, 1911.

Application filed February 18, 1911. Serial No. 609,410.

*To all whom it may concern:*

Be it known that I, WILLIAM H. HUTCHINSON, of Rochester, in the county of Monroe and State of New York, have invented certain new and useful Improvements in Egg-Detectors; and I do hereby declare the following to be a full, clear, and exact description of the same, reference being had to the accompanying drawings, forming a part of this specification, and to the reference-numerals marked thereon.

My present invention has for its object to provide an instrument for detecting the quality of eggs and determining their adaptability for various purposes, such as use in incubators, or with sitting hens and for household use.

A further object of my invention is to provide a device which is simple in construction and will enable the operator to grade a quantity of eggs obtained from different sources and at different times, in accordance with the degree of freshness which the eggs may show when tested separately. To this end I have provided improved means for readily determining the specific gravity of the egg and indicating its age and quality.

To these and other ends the invention consists in certain improvements and combinations of parts all as will be hereinafter more fully described, the novel features being pointed out in the claims at the end of the specification.

In the drawings: Figure 1 is a vertical sectional view of an instrument showing one embodiment of my invention; Fig. 2 is a vertical sectional view, with parts broken away, showing the instrument in one position of adjustment; Fig. 3 is a vertical sectional view on the line 3×—3× of Fig. 1; Fig. 4 is a vertical sectional view showing a modification; Fig. 5 is a vertical sectional view on the line 5×—5× of Fig. 4; Fig. 6 is a vertical sectional view showing a further modification; and Fig. 7 is a vertical sectional view on the line 7×—7× of Fig. 6.

An instrument constructed in accordance with my invention is adapted to determine the quality of an egg by means of the variations which occur in its specific gravity due to its age, but, it will be understood, of course, that the deterioration which an egg undergoes depends largely upon the condition under which it is kept, although there will be a gradual diminution from day to day which will cause the egg in time to pass through the various commercial grades known as strictly fresh, fresh, good, fair and stale. As an egg passes from one grade to another, its specific gravity changes and by means of a suitable apparatus, such a fact may readily be determined.

Referring more particularly to the drawings, in which like reference characters designate corresponding parts in the several views, I have illustrated my invention as comprising a suitable holder or frame in which an egg may be supported and submerged in a body of liquid, the holder being provided with a scale having suitable indications by means of which the character of the egg may be determined by the distance to which it becomes submerged. Any suitable form of receptacle may be employed, and in the drawings I have shown a rectangular tank having the side walls 1 and bottom 2. The several modifications of the apparatus illustrated possess certain common features, that is, each of the several holders are revoluble about an axis, each is provided with a scale bar by means of which the buoyancy of an egg may be determined, and each is also provided with means for compensating the increased leverage or power exerted as the egg approaches a horizontal position. In Fig. 1 the axis is pivoted on the walls of the tank, in Fig. 4 the pivot is carried on a clip or bracket which is detachably connected to the wall of the tank, and in Fig. 6 the pivotal axis of the carrier is formed by a float resting on the surface of the liquid.

In carrying out my invention I provide a holder comprising two parallel rods 4, suspended from a shaft 5 and connected at their lower ends by a cross bar 6. The rods are preferably separated a short distance as shown in Fig. 3 and extending in front of them is a loop 7 of resilient wire which is secured to the ends of the cross bar and serves to lightly hold an egg in engagement with the lower ends of the rods. The loop forms a saddle for the egg and is so shaped that an egg may be easily inserted and removed and held, preferably, with its larger end down and its major axis extending at right angles to the pivot of the holder. It will be appreciated that a certain advantage is obtained by positioning the eggs in the holder as just described because of the fact that an instrument of this character should be very sensitive and especially free in its movements, and in the event the egg is positioned with its major axis parallel to the shaft 5 it will exert a tendency to cramp the holder on its bearings due to the attempt of the egg to turn in a position with its larger end upward, and the poorer the quality of an egg the greater this tendency becomes. On the other hand the positioning of the egg with its larger end downward permits it to exert a greater leverage on the holder as it rotates the latter away from a vertical position, this leverage necessarily increasing as the quality of the egg deteriorates and the holder approaches a horizontal position. It is important to overcome this increasing leverage or power in order that an evenly graduated scale bar may be employed which is adapted for universal use to properly grade eggs of different sizes. In order to provide means for compensating the difference in power exerted by the egg as it moves away from its lowermost position and approaches a horizontal position, I attach to the shaft 5 an arm 8 on which is adjustably mounted a small weight 9. This weight is positioned in the first instance by comparison of the readings of its scale bar with those of a standard instrument which is known to be correct.

Attached to the cross bar 6 is a scale bar 10, which is preferably curved, as shown, although this may be of some other suitable form. The scale bar 10, which moves with the holder, is provided with graduations, as shown, which have been established as approximately correct by averages obtained from experiments extending over a considerable period of time with eggs which have been kept under different conditions of temperature. It will be noticed that the shaft 4 is arranged at one end of the receptacle a short distance below its upper edge, so that when an exceptionally poor or stale egg is inserted in the holder and the receptacle is filled with water, the egg will support the holder in the position shown in Fig. 2, which is about the position the holder assumes when the egg is inserted therein. Eggs of different qualities, possessing different specific gravities, will sink to different depths in the liquid and carry the holder downwardly from the position shown in Fig. 2 to that shown in Fig. 1, or some intermediate position, and from this automatic adjustment of the holder the quality of any egg may be determined.

As the holder moves from one position to another, according to the quality or age of the egg, the scale is moved a corresponding distance, causing a portion of the scale bar to project above the surface of the liquid in the receptacle, and the parts are so designed and arranged that the reading on the scale at the level of the liquid, after the egg has been inserted in the holder, will indicate the quality of the egg.

In Figs. 4 and 5, I have shown a modified form, to provide for detachably securing the instrument to the wall of any suitable receptacle. This includes a plate 12 having an arm or hook 13 by which it engages a wall of the receptacle, and provided with a bracket 14, in which the shaft 15 is fixed. The frame rods 16 of the holder are journaled on the ends of the shaft 15, and are connected at their lower ends by means of a cross-bar 17. This holder, instead of being provided with the weighted arm, as in the form shown in Fig. 1, is loaded or weighted at its lower end. The ends 18 of the cross-bar are made hollow and contain small shot or other weights, which may be varied according to the requirements of the instrument. In using the instrument in this embodiment, any form of receptacle may be employed which will hold sufficient liquid to permit the egg to be immersed to the lowest limit of movement of the holder, the plate 12 engaging over the side of the receptacle permitting the holder to hang downward when in normal position. The advantage of this form is that no special receptacle is required, the shape of the clip 13 being susceptible to variation to permit it to detachably coöperate with the wall of a pail or similar receptacle. The level of the liquid, however, should be at such a height that the holder is immersed when in a horizontal position.

In Figs. 6 and 7, I have disclosed a further modified form of my invention, there being in this arrangement of parts no connection between the instrument proper and the walls of the receptacle within which it operates. To this end I employ a float 19, which may be a hollow body, or a cylindrical piece of wood or other suitable material sufficiently buoyant to lie on the surface of the liquid, and support the remaining parts with the load they are adapted to carry. The float 19 has rods 20 fixedly secured thereto at one side in the position shown so that they will always be beneath the surface of the liquid, said rods being connected at their lower ends by a cross-bar 21, and provided with a holder and scale as in the other forms of my invention, previously described. In the operation of this embodiment of the instrument, the float lies at all times on the surface of the liquid, and when an egg is secured in the holder, the latter, together with the graduated scale, is moved upwardly as though the holder was pivoted at or near the surface of the liquid, the float, of course, turning during the rotary movement of the holder, and to a corresponding degree. The cramping effect of the holder on its axis, attributed to the attempt of the egg to turn in the liquid with its larger end uppermost when disposed with its major axis in a plane parallel to the pivot of the holder, as described in connection with the construction shown in Figs. 1 and 4, is particularly noticeable when the holder is arranged as shown in Fig. 6. An egg so disposed in this holder if of poor quality will either cause it to capsize or incline the holder at an angle to the surface of the liquid. In using this form of the device the egg is disposed in the saddle with its larger end pointing away from the float 19, and the increase of the leverage thus afforded the poor egg as it rises into a horizontal position, as compared with the smaller force exerted by a good or fresh egg which will be submerged to a greater depth, may be overcome by the use of weights, as before described, or by employing a scale bar 21 of buoyant material which is preferably tapered toward its lower end. This increases the buoyancy of the holder in proper ratio as it moves downwardly beneath the surface of the liquid. Inversely speaking, the tapering of the scale bar toward its lower end causes its buoyancy to be lessened as it is elevated by an egg of poor quality.

The major parts of the instruments, such as the depending arms, the cross member connecting them and the scale bar, are preferably constructed of wood as these parts are small and light in weight and when properly proportioned, about as shown, provide a simple construction which may be adjusted to give accurate results by varying the weights or other means which may be employed to compensate for increasing the buoyant effect of the poorer quality of eggs.

It will be seen that with each form of the device the surface or level of the liquid constitutes the indicator, with which the graduations of the movable scale bar coöperate, although any other desirable and suitable form of stationary indicator might be employed in this connection, and whatever form of the device the user may desire to adopt, each comprises a holder which rotates about an axis lying beneath or in the plane of the surface of the water, or other liquid.

I claim as my invention:

1. In an egg detector, the combination with a liquid receptacle, of a holder located therein having pivotal movement relatively to the surface of the liquid and adapted to receive an egg and to be adjusted in its position by the buoyance of the egg, a scale attached to the holder and coöperating with a relatively stationary indicator.

2. In an egg detector, the combination with a liquid receptacle, of a holder located therein having pivotal movement relatively to the surface of the liquid and adapted to receive an egg and to be adjusted in its position by the buoyance of the egg, a scale attached to the holder and coöperating with the surface of the liquid in the receptacle, the surface of the liquid constituting an indicator.

3. In an egg detector, the combination with a liquid receptacle, of a holder pivotally mounted therein adapted to receive an egg and to be adjusted by the buoyancy of the egg, and a scale bar attached to the holder and adapted to coöperate with the surface of the liquid to indicate the quality of an egg.

4. In an egg detector, the combination with a liquid receptacle, of a holder therein having pivotal movement relatively to the surface of the liquid and adapted to receive an egg and to be adjusted in its position by the buoyance of the egg, and a scale bar attached to and projecting from one side of the holder and coöperating with the surface of the liquid in the receptacle to indicate the quality of an egg.

5. In an egg detector, the combination with a receptacle for containing liquid, of a holder revolubly supported therein adapted to receive an egg and to be adjusted in its position by the buoyance of the egg in the liquid, and a curved scale bar projecting laterally at one side of the holder, and coöperating with the surface of the liquid, the surface of the liquid constituting an indicator.

6. In an egg detector, the combination with a receptacle for containing liquid, of a holder revolubly supported in the liquid and adapted to receive an egg and to be adjusted in its position by the buoyance of the egg, said holder comprising an axial portion, parallel rods depending therefrom, a cross bar connecting their lower ends and a scale carried by the holder, the parts of the holder being constructed of buoyant material, and adapted to be submerged different distances according to the specific gravity of the egg, and the scale being arranged to coöperate with the surface of the liquid to indicate the depth of submergence.

7. In an egg detector, the combination with a receptacle for containing liquid, of a holder constructed of buoyant material revolubly supported in the liquid and adapted to receive an egg and to be adjusted into a submerged position by the specific gravity of the egg, a curved scale bar, also of buoyant material, carried by the holder and tapered toward its lower end, said scale coöperating with the surface of the liquid, the surface of the liquid constituting an indicator.

8. In an instrument of the character described, the combination with a receptacle containing liquid, of a pivoted holder arranged with its axis in proximity to the surface of the liquid and having at its opposite end a saddle adapted to receive an egg and support it in a position with its major axis at right angles to the axis of the holder, means on the holder for compensating the increased buoyant effect of an egg of poor quality as it moves the holder toward a horizontal position, and a scale bar attached to the holder and provided with graduations and adapted to coöperate with the surface of the liquid to indicate the quality of an egg.

WILLIAM H. HUTCHINSON.

Witnesses:
G. WILLARD RICH,
RUSSELL B. GRIFFITH.

Copies of this patent may be obtained for five cents each, by addressing the "Commissioner of Patents Washington, D. C."